United States Patent [19]

Janzen

[11] 4,255,920
[45] Mar. 17, 1981

[54] SUNFLOWER HARVESTER ATTACHMENT FOR COMBINES

[75] Inventor: Samuel P. Janzen, Winkler, Canada

[73] Assignee: New J Industries Ltd., Winkler, Canada

[21] Appl. No.: 32,540

[22] Filed: Apr. 23, 1979

[51] Int. Cl.³ .............................................. A01D 45/00
[52] U.S. Cl. .......................................... 56/126; 56/130
[58] Field of Search ................ 56/126, 127, 128, 130, 56/14.3, 14.4, 96, 97

[56] References Cited

U.S. PATENT DOCUMENTS

| | | | |
|---|---|---|---|
| 2,575,120 | 11/1951 | Peel | 56/125 |
| 2,765,612 | 10/1956 | Raumaker et al. | 56/97 |
| 3,139,718 | 7/1964 | Rickerd et al. | 56/119 |
| 3,812,661 | 5/1974 | Baker | 56/14.4 |
| 3,844,094 | 10/1974 | Janzen | 56/126 |
| 4,106,191 | 8/1978 | Haralambou | 56/194 |

*Primary Examiner*—Paul J. Hirsch
*Attorney, Agent, or Firm*—Stanley G. Ade

[57] ABSTRACT

A plurality of divider pans are secured to the front of the header just above the reciprocating knife thereof, to collect the heads as they are severed. The pans are adjustable angularly relative to the ground and are supported by bracing means underneath the pans. Pan tail portions are adjustably secured to the underside braces and extend underneath and to the rear of the header where they are secured to the header. A reel and shield are secured over the auger and brushes extend across the gaps between the adjacent pans to catch sunflower seeds which separate from the heads as they are deposited onto the pans. Dividers are secured one to each end of the header and to the conventional reel arms which are disconnected when this attachment is secured to the header.

8 Claims, 7 Drawing Figures

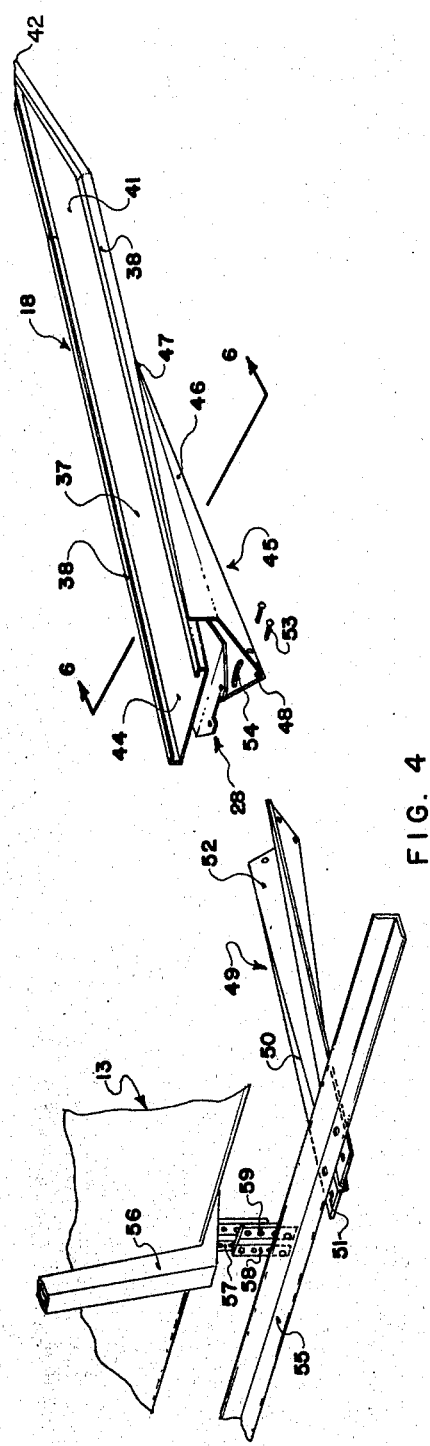
FIG. 4
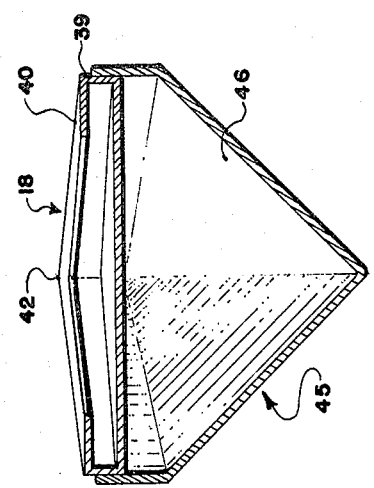
FIG. 6
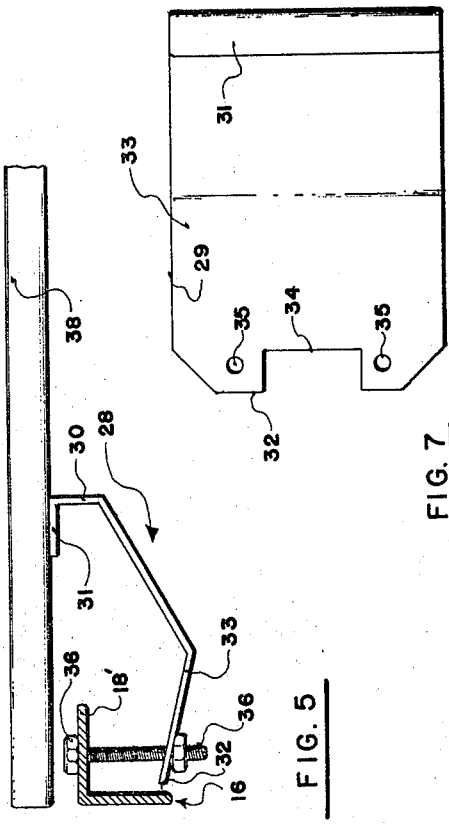
FIG. 5
FIG. 7

1

SUNFLOWER HARVESTER ATTACHMENT FOR COMBINES

BACKGROUND OF THE INVENTION

This invention relates to new and useful improvements in attachments to harvesters and is particularly designed to harvest sunflower seeds. This invention is an improvement over U.S. Pat. No.: 3,844,094 dated Oct. 29th, 1974.

SUMMARY OF THE INVENTION

The present invention is designed to enable a conventional combine harvester to be readily adapted for use for harvesting sunflower seeds by means of an attachment which is easily secured and detached from an existing harvester.

In accordance with the invention there is provided in a harvester which includes a header for feeding harvested crop to the interior thereof and which includes a transverse reciprocating knife assembly at the front thereof; an attachment for harvesting sunflowers, said attachment comprising in combination a plurality of crop divider pans secured by the rear end thereof in spaced and parallel relationship, to the front of the header immediately above the knife assembly, a substantially vertical divider at each side of said header extending forwardly parallel to said crop divider pans and means to secure said crop divider pans to said header thereby supporting same in cantilever fashion forwardly of said header.

Another advantage of the present invention is the provision of divider pans which not only divide the crop but also include pan portions which can receive the seeds spilled from the heads just prior to the heads being severed from the stalk. This saves a considerable amount of seed which normally shatters from the heads particularly when same are in a slightly overripe condition when being harvested.

Another advantage of the present invention is to provide a device of the character herewithin described which is readily attached and detached from an existing combine harvester header assembly and which furthermore provides adequate support for the divider pans which extend forwardly from the header in cantilever fashion.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 4 is a fragmentary isometric exploded view of one of the divider pans showing the method of attachment to the header.

FIG. 5 is a fragmentary side elevation of one of the pans showing the attachment to the front of the header.

FIG. 6 is a fragmentary section substantially along the line 6—6 of FIG. 4.

FIG. 7 is a top plan view of one of the attachment brackets per se.

In the drawings like characters of reference indicate corresponding parts in the different figures.

DETAILED DESCRIPTION

Figure 1:
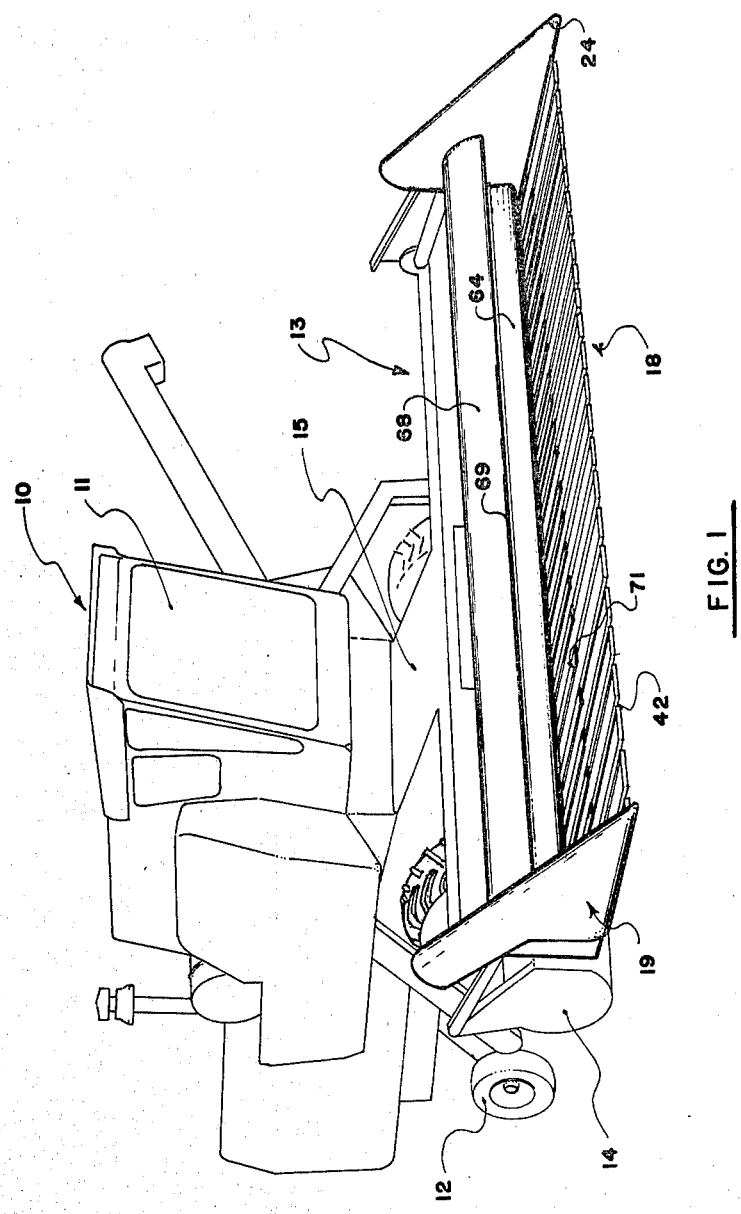
FIG. 1 is an outline of a combine harvester with the invention attached thereto.

Proceeding therefore to describe the invention in detail, reference should first be made to FIG. 1 in which 10 illustrates generally a conventional combine having the driving cab 11 at the front thereof and being mounted upon ground engaging wheels 12 and having a conventional header asssembly collectively designated 13 mounted across the front thereof. Said header assembly includes the main transverse collector casing 14 within which a collecting auger (not illustrated) is mounted to feed the crop to the central rearward delivery elevator 15 leading to the concave assembly (not illustrated).

Situated on the front of the header trough or pan 14 is a conventional reciprocating knife assembly 16 shown schematically in FIG. 5, including the knife guards 17 which are secured to a transverse angle member 18' extending across the collector trough 14, it being understood that the knife assembly is reciprocated in the usual manner from the source of power of the combine (not illustrated).

In the present invention, a plurality of crop dividing pans collectively designated 18 are provided secured to the front of the header and extending forwardly therefrom in spaced and parallel relationship as clearly shown in the drawings. End dividers collectively designated 19 are also secured one upon each side of the header assembly and extend forwardly thereof parallel to the divider pans 18.

In detail, the end dividers 19 include the substantially triangular vertical wall portion 20 having the curved downwardly and forwardly extending upper side edge 21, a vertical rear edge 22, a pan base flange 23 extending inwardly from the lower edge of the side wall 20 and the crop dividing leading edge or end 24.

Figures 2, 3:
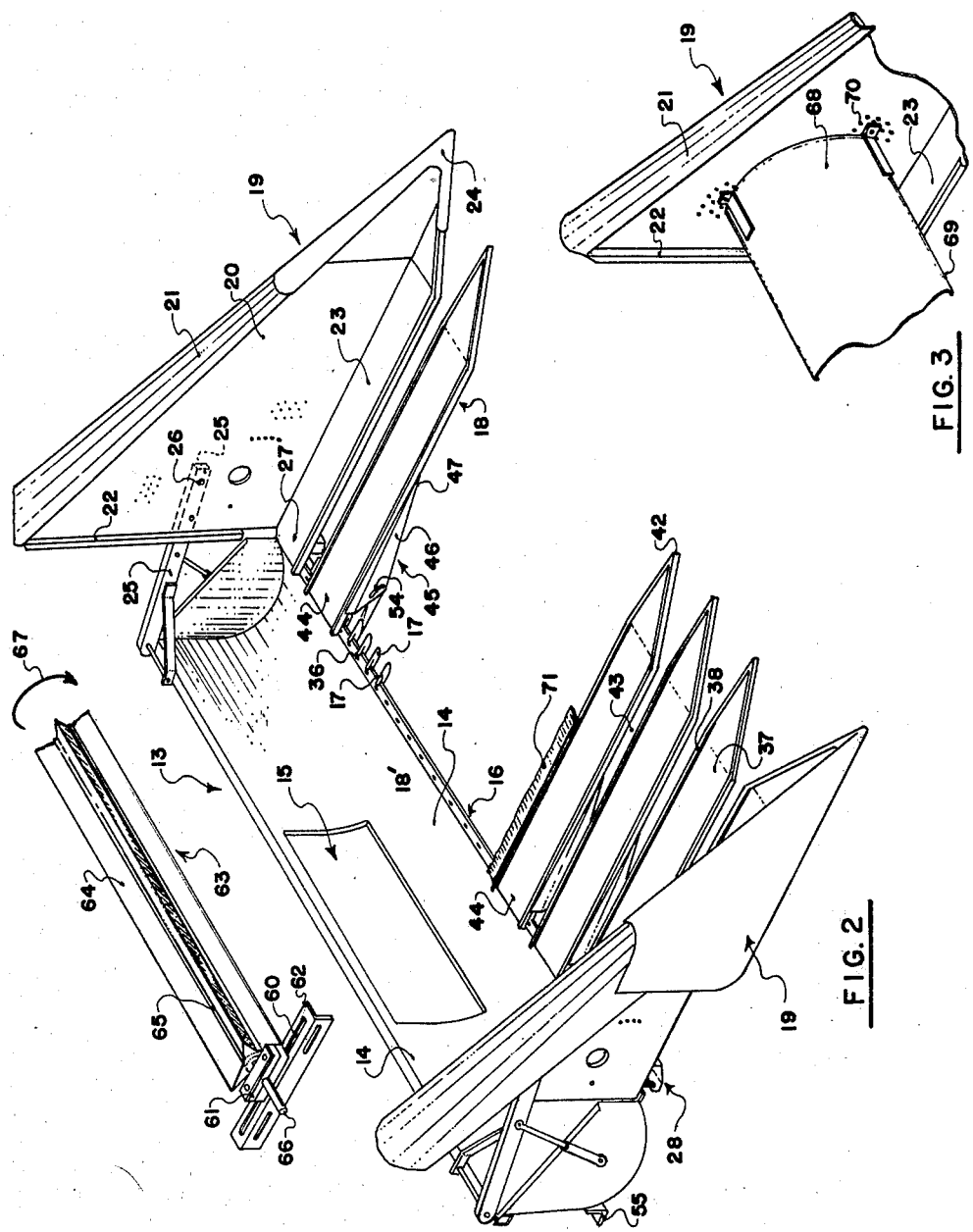
FIG. 2 is a fragmentary partially exploded view of the invention per se showing the portion of the harvester header assembly.
FIG. 3 is a fragmentary isometric view of one end divider with the shield secured thereto.

Conventional reel carrying arms 25 extend forwardly from the header assembly 13 and the side dividers 19 are bolted to the front ends of the arms by means of bolt and nut assemblies 26 as shown in FIG. 2.

The rear end 27 of the pan flanges 23 are secured to the angle member 18' at the front lower side of the header trough 14 and in this connection, a C-shaped bracket collectively designated 28 is secured to the underside of the horizontal flanged pan 23 adjacent the rear side thereof. This C-shaped bracket 28, which is also used to assist in securing the pans 18, is shown in FIGS. 5 and 7. It includes a substantially V-shaped portion 29 when viewed in cross section having a forwardly situated vertical wall 30 extending upwardly therefrom and a rearwardly turned horizontal flange 31 formed on the upper edge of the wall 30 and welded to the underside of the pan flange 23. The rear edge 32 of the rear portion 33 of the V-shaped portion 29, is provided with a rectangular cutout 34 and apertures 35 one upon each side thereof which enables this portion of the C-shaped bracket to engage under the angle member 18' and upon two of the bolt and nut assemblies 36 holding the knife guard to the angle member 18′. It is preferable that the bolts 36 be longer than normal and that two convenient bolts engage through apertures 35 whereupon additional nuts may be engaged upon the extending bolt portions to clamp the C-shaped flange firmly to the underside of the knife assembly. The cutout portion 34 clears nut and bolt assemblies 36 between nut and bolt assemblies engaging apertures 35.

This together with the reel arm 25 attachment, firmly secures the dividers 19 one upon each side of the header assembly 13.

The divider pans 18 include a planar base 37 having channel portions 38 formed upon each longitudinal edge of the base and extending upwardly therefrom to form a retaining wall around the base 37. Said channel portion including the vertical walls 39 and the inturned horizontal flange portions 40 as clearly shown in FIG. 6.

The front ends 41 of these divider pans converge inwardly and forwardly to a pointed front end 42 and assist in parting the crop and causing same to pass on either side of the divider pans and through the longitudinally extending space 43 between adjacent pans as clearly shown in FIGS. 1 and 2.

These pans 18 are also provided with one of the C-shaped brackets 16 secured to the underside 37 adjacent the rear end thereof and these attach to the guard bolt and nut assemblies 36 in a manner similar to that hereinbefore described with the rear end portion 44 of the divider pans engaging on top of the angle member 18′ as clearly illustrated in FIG. 2. It should be observed that the rear end 27 of the pan portion 23 of the dividers 19 also engages on top of the angle member 18′.

Means are provided to support the divider pans 18 in cantilever fashion fowardly of the header 13 and to permit angular adjustment of the pans in the fore and aft direction relative to the horizontal.

Reference to FIG. 4 will show a brace assembly collectively designated 45 consisting of a V-shaped portion 46 welded to the underside and diverging outwardly and rearwardly towards the rear ends 44 of the pans and also increasing in depth from the front end 47 of the V-shaped portion towards the rear end 48 thereof.

A pan tail portion collectively designated 49 is also substantially V-shaped when viewed in section with the upper edges 50 thereof flanging outwardly to form the rear attaching portions 51 as illustrated in FIG. 4. The front end 52 of the pan tail 49 snugly engages the rear end 48 of the V-shaped portion 46 and is bolted thereto by means of nut and bolt assemblies 53. It will be noted that arcuate slots 54 are provided in the side walls of the V-shaped portion 45 to enable the fore and aft angular relationship to be adjusted between the divider pan 18 and the pan tail 49. This enables the inclination of the divider pan 18 to be adjusted as desired and it is preferably inclined slightly upwardly and forwardly relative to the header assembly.

The flanged rear sides 51 of the pan tail 49 are bolted to an angle member 55 situated transversely across the rear of the header and underneath same and being secured to a convenient frame member 56 situated at the back of the header assembly 13 by means of adjustable brackets 57 and 58 and nut and bolt assemblies 59. The pan tail 49 extends under the header as clearly shown and is secured to members 56 as hereinbefore described thus giving adequate support to the cantilever mounting of the divider pans and permitting the aforementioned angular adjustment thereof.

Bearing support brackets 60 are bolted to the vertical walls 20 of the side dividers 19 and support bearing block assemblies 61 which are secured thereto in adjustable relationship through the fore and aft elongated slot 62.

A reel collectively designated 63 includes, in this embodiment, 3 blades 64 extending from the central cylindrical portion 65 and is also provided with stub shafts 66 which are journalled for rotation within the bearing block assemblies 61. It is connected to the source of power on the combine by conventional means (not illustrated) for rotation in the direction of arrow 67. This reel is situated forwardly of the front member 18′ of the header assembly and just above the pans 18.

An arcuately curved shield 68 is bolted to the inner surface of the vertical walls 20 of the end dividers 19 and this shield extends across the front of the header and partially encloses the reel 63 with the lower edge 69 of the curved shield being spaced above the pans 18 sufficiently to allow the sunflower seed heads to pass between the pans and this lower edge 69. In this connection a plurality of apertures 70 is provided in the dividers to permit adjustment of this relationship.

Finally, flexible bristles 71 are secured to one side edge of each of the divider pans 18 and extend substantially transversely across the space 43 between adjacent pans. These are sufficiently flexible to allow the stalks of sunflowers to pass between the pans yet at the same time catch the majority of any sunflower seeds which may be shattered from the heads as they pass between the dividers pans 18, these seeds then being deposited within the pans whereupon they are transmitted to the interior of the header trough 14 by vibration and also the inclination of the divider pans 18.

In operation, the pans are secured to the header as hereinbefore described together with the side dividers 19, it being understood that the conventional reel is removed and the hydraulics controlling the arms 25, disconnected.

The shield 68 is adjusted to give sufficient clearance between the lower edge 69 thereof and the upper side of the pans and the angle of inclination of the pans 18 is adjusted to suit the circumstances.

The header assembly which is preset to the desired height of cut, moves forwardly through the sunflower crop with the divider pans dividing the crop and causing same to pass between adjacent pans to be severed by the knife assembly 16 so that the heads fall upon the pans and are conveyed by vibration and the slope of the pans under the curved shield 68 to be picked up by the reel 63 and fed to the main feed auger (not illustrated) which conveys the crop to the transfer conveyor 16 so that it is threshed in the usual way. The majority of any seed that shatters from the heads during this process is caught by the bristles 71 and transferred to the pans whereupon it is deposited within the interior of the header trough 14 to be picked up by the auger assembly therein.

It is desirable that the outer edges of the blades 64 of the reel be adjusted so that they are approximately 1 inch above the pans 18 and that the lower edge of the shield 68 be situated approximately 8 to 10 inches above the upper surface of the pans. If however the sunflowers have unusually large heads, this dimension may have to be increased.

Since various modifications can be made in my invention as hereinabove described, and many apparently widely different embodiments of same made within the spirit and scope of the claims without departing from such spirit and scope, it is intended that all matter contained in the accompanying specification and shall be interpreted as illustrative only and not in a limiting sense.

What I claim as my invention:

1. In a harvester which includes a header for feeding harvested crop to the interior thereof and which includes a transverse reciprocating knife assembly at the front thereof; an attachment for harvesting sunflowers, said attachment comprising in combination a plurality of crop divider pans secured by the rear end thereof in spaced and parallel relationship, to the front of the header immediately above the knife assembly, a substantially vertical divider at each side of said header extending forwardly parallel to said crop divider pans and means to secure said crop divider pans to said header thereby supporting same in cantilever fashion forwardly of said header, said means including brace means secured to the underside of said pans adjacent the rear thereof, said brace means extending rearwardly under said header and being secured to adjacent the rear of said header, said brace means including a V-shaped portion secured to the underside of said pans and increasing in depth from the front to the rear of said V-shaped portion, a pan tail portion adjustably secured by the front end thereof to the rear end of said V-shaped portion, said pan being adjustably secured to said pan tail for adjusting the fore and aft angle of inclination of said pan and a bracket assembly secured to the rear end of said pan tail and to said header adjacent the rear side thereof.

2. The device according to claim 1 in which each of said crop divider pans includes a substantially planar base, longitudinally extending channel portions forming side edges on each longitudinal side of said base, the forward ends of the sides and base of said crop divider pans converging forwardly to form a pointed front end to assist in dividing the crop upon each side thereof and to guide said crop between adjacent crop divider pans.

3. The device according to claim 1 in which each of said vertical dividers includes means to secure same to the end of said header and a reel assembly journalled for rotation between said dividers forwardly of said header and just above the rear portion of said pans.

4. The device according to claim 2 in which each of said vertical dividers includes means to secure same to the end of said header and a reel assembly journalled for rotation between said dividers forwardly of said header and just above the rear portion of said pans.

5. The device according to claim 3 which includes an arcuately curved shield secured between said dividers and extending therebetween to partially enclose said reel, said knife assembly and the rear portion of said pans, said shield being spaced above said pans and curving outwardly and downwardly from said header to present a convex outer surface.

6. The device according to claim 4 which includes an arcuately curved shield secured between said dividers and extending therebetween to partially enclose said reel, said knife assembly and the rear portion of said pans, said shield being spaced above said pans and curving outwardly and downwardly from said header to present a convex outer surface.

7. The device according to claims 1, 2, or 3 in which said means to secure said crop divider pans includes a C-shaped bracket secured to the underside of said pan adjacent the rear end thereof, said C-shaped bracket being secured under said knife assembly to partially enclose said knife assembly whereby said knife is effective only between adjacent pans and flexible bristle means extending across the junction between adjacent pans to catch sunflower seeds and to direct said seeds into said pans, said pans communicating with said header at the rear ends thereof.

8. The device according to Claims 4, 5 or 6 in which said means to secure said crop divider pans includes a C-shaped bracket secured to the underside of said pan adjacent the rear end thereof, said C-shaped bracket being secured under said knife assembly to partially enclose said knife assembly whereby said knife is effective only between adjacent pans and flexible bristle means extending across the junction between adjacent pans to catch sunflower seeds and to direct said seeds into said pans, said pans communicating with said header at the rear ends thereof.

* * * * *